United States Patent [19]
Stoss

[11] Patent Number: 6,099,013
[45] Date of Patent: Aug. 8, 2000

[54] SPRAY CART

[76] Inventor: Harlan N. Stoss, P.O. Box 161, Olmitz, Kans. 67564

[21] Appl. No.: 09/193,456

[22] Filed: Nov. 17, 1998

Related U.S. Application Data

[60] Provisional application No. 60/066,893, Nov. 25, 1997.

[51] Int. Cl.$^7$ ...................................................... B60P 3/22
[52] U.S. Cl. ...................... 280/407; 280/408; 280/490.1; 280/85; 280/677; 111/118
[58] Field of Search .................................... 172/386, 677; 111/118, 119, 127; 280/407, 408, 490.1, 677, 682, 85, 80.1, 407.1

[56] References Cited

U.S. PATENT DOCUMENTS

| | | |
|---|---|---|
| 3,062,563 | 11/1962 | Pearce . |
| 4,579,361 | 4/1986 | Lowe et al. . |
| 4,807,544 | 2/1989 | Cross et al. ................................. 111/7 |
| 4,861,065 | 8/1989 | Cote ......................................... 280/678 |
| 5,322,328 | 6/1994 | Van Mill et al. ...................... 280/789 |
| 5,665,615 | 9/1997 | Mick ..................................... 180/24.02 |

*Primary Examiner*—Brian L. Johnson
*Assistant Examiner*—Avraham H. Lerner
*Attorney, Agent, or Firm*—George H. Morgan

[57] ABSTRACT

A spray cart with pivoting suspension assemblies that include articulating trailing wheels with a hitch arrangement that can vary the amount of weight of the spray cart that can be transferred either to a towing vehicle or to an implement towed by the spray cart. The advantage of this variable weight transfer includes reducing soil compaction by the spray cart wheels by shifting weight to the tractor or by shifting weight to a towed disc, the disc is more effective. The spray cart has means of attachment to a towed disc or plow that effectively creates a single unit out of the spray cart and the towed disc or plow. This combined with the articulating trailing wheels reduces side loads on the wheels.

2 Claims, 6 Drawing Sheets

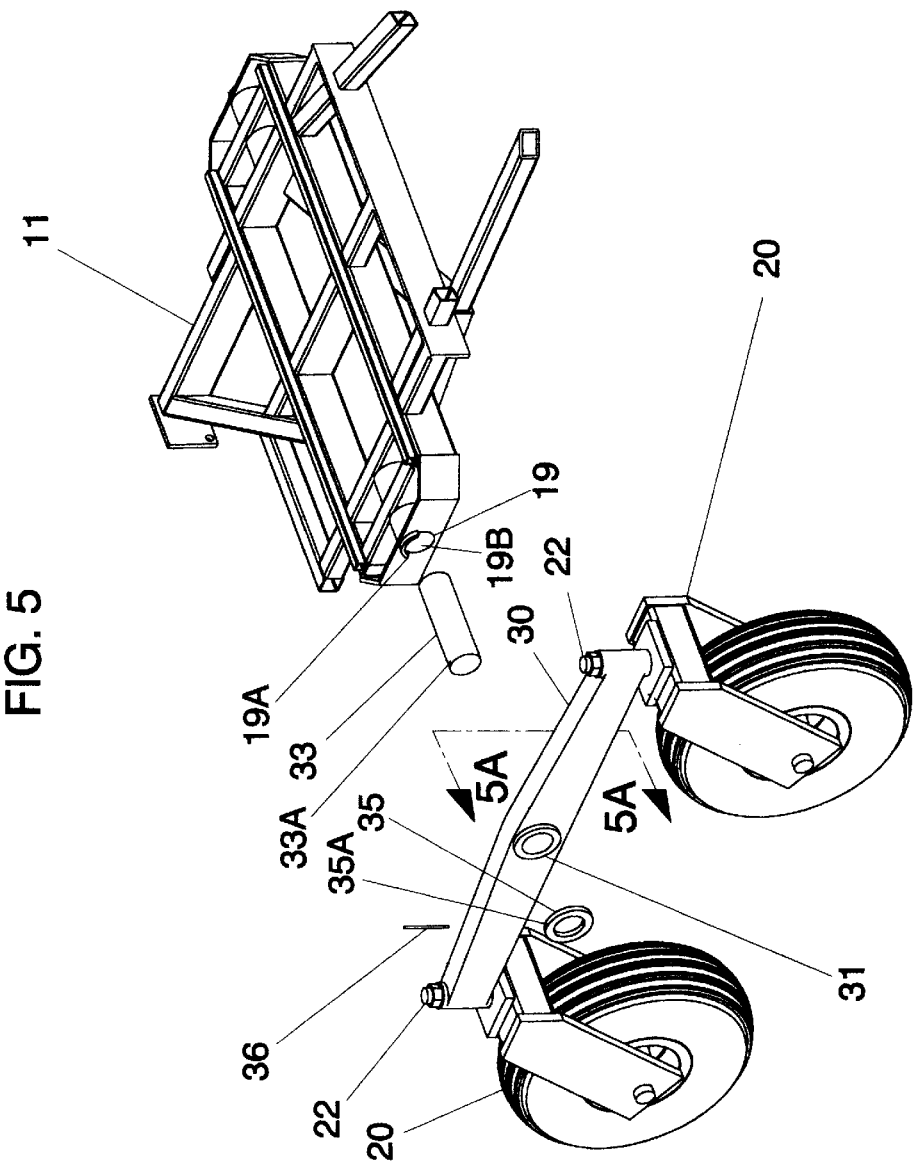
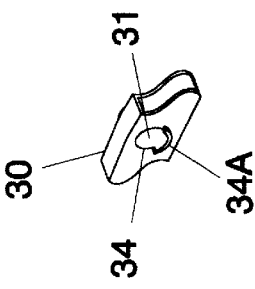
FIG. 5
FIG. 5A

SPRAY CART

This application claims the benefit of U.S. Provisional No. 60/066,893 filed Nov. 25, 1997.

BACKGROUND OF THE INVENTION

1. Field of the Invention

The present invention is an improved four wheel spray cart with a swivel wheel arrangement that is towable between an agricultural tractor and an implement.

2. Background Information

Volume liquid spraying, such as is required by relatively large scale farming operations, currently has limitations. For example, self propelled sprayers are limited in carrying capacity, ground compaction is a problem, and someone has to drive it. Spray tanks are mounted off tractors as saddle tanks, but the size of the tanks are limited which limits the amount of liquid spray that can be carried in one trip. Large conventional trucks are not suited for driving over plowed land. In "no till" farming practises, it is desirable to save fuel and minimize labor by reducing the number of times different operations are conducted on the soil. An approach to this is to combine operations in a single pass, where possible. Current practise includes using one or more two wheel spray carts attached between an agricultural tractor and a disc plow. A two wheel spray cart is usually limited to a maximum of 750 gallons of liquid spray. With current two wheel spray carts, in such a train, turning is a problem. The rear of the towing tractor tends to be pulled sideways by the train. Each two wheel spray cart tends to be pulled sideways by the attachment or attachments behind it. This puts stresses sideways on the wheels, resulting is wheel damage, tire damage and wear, and spindle breakage. It is desirable to pull a blade plow behind the last sprayer. This contributes to the side pulling of the train on each of the implements and the tractor ahead of the train. Also, two wheel spray carts tend to compact the soil as the weight on the soil is concentrated as compared to the present invention. As will be shown in the subsequent description these limitations of the current practises are overcome by the preferred embodiment of the present invention.

SUMMARY

The present invention is a towable spray cart with pivoting suspension assemblies that include articulating trailing wheels with a hitch arrangement that can vary the amount of the weight of the spray cart transferred to the towing vehicle and to the towed disc or plow.

BRIEF DESCRIPTION OF THE DRAWING

FIG. 5 shows a suspension assembly of the preferred embodiment of the present invention.

DESCRIPTION OF THE PREFERRED EMBODIMENTS

Figure 1:
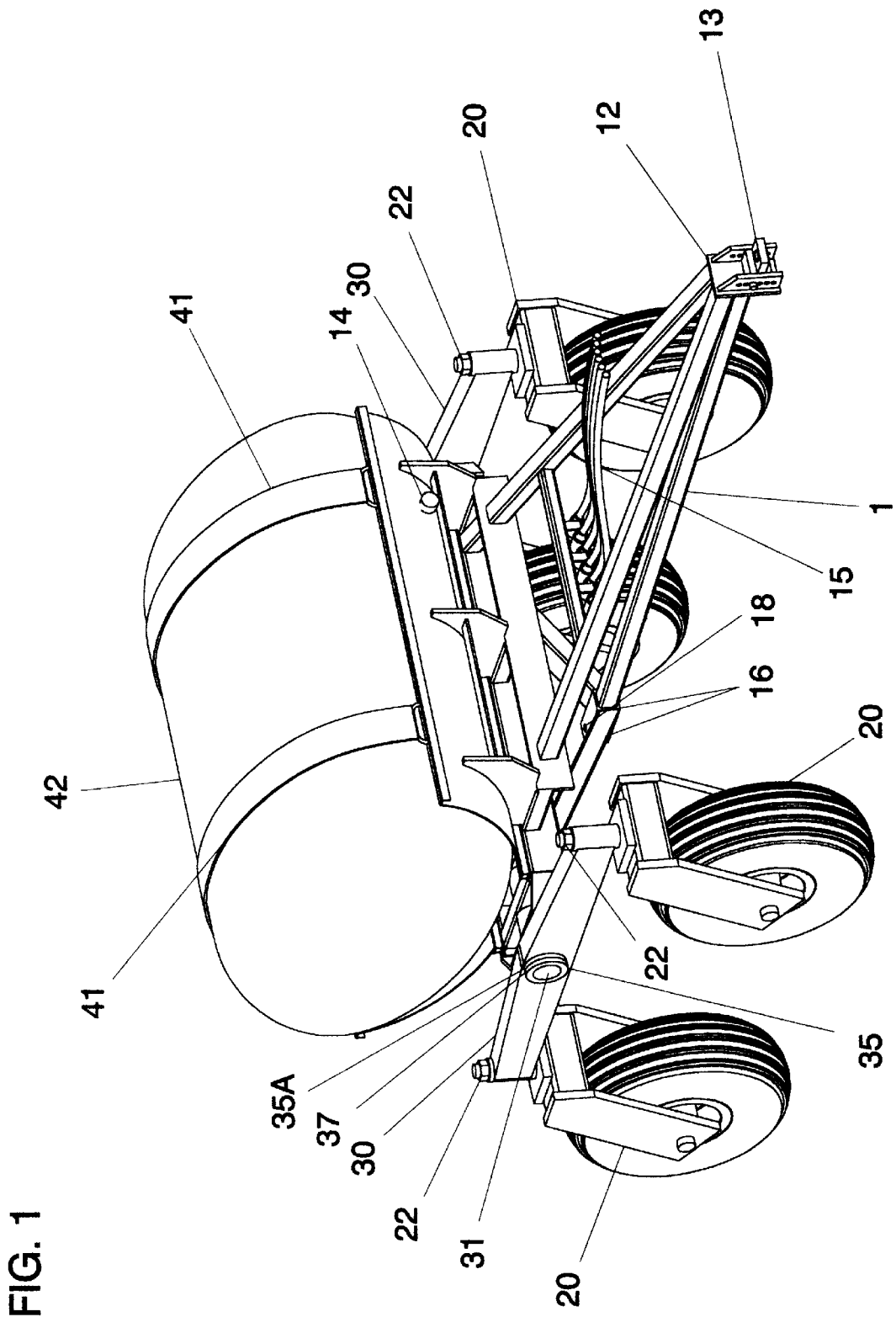
FIG. 1 shows the preferred embodiment of the present invention with a tank.
Figure 2:
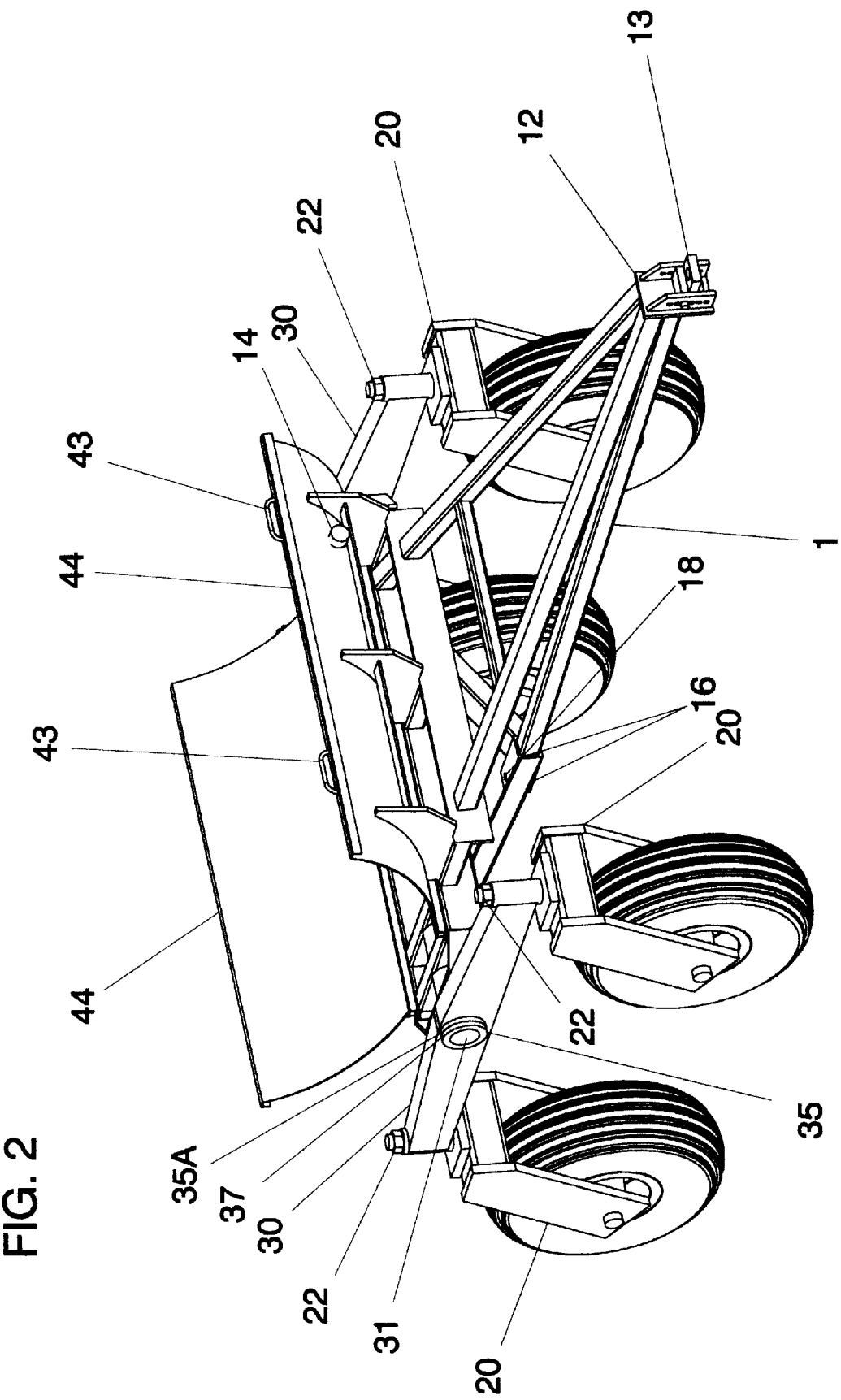
FIG. 2 shows the preferred embodiment of the present invention.
Figure 3:
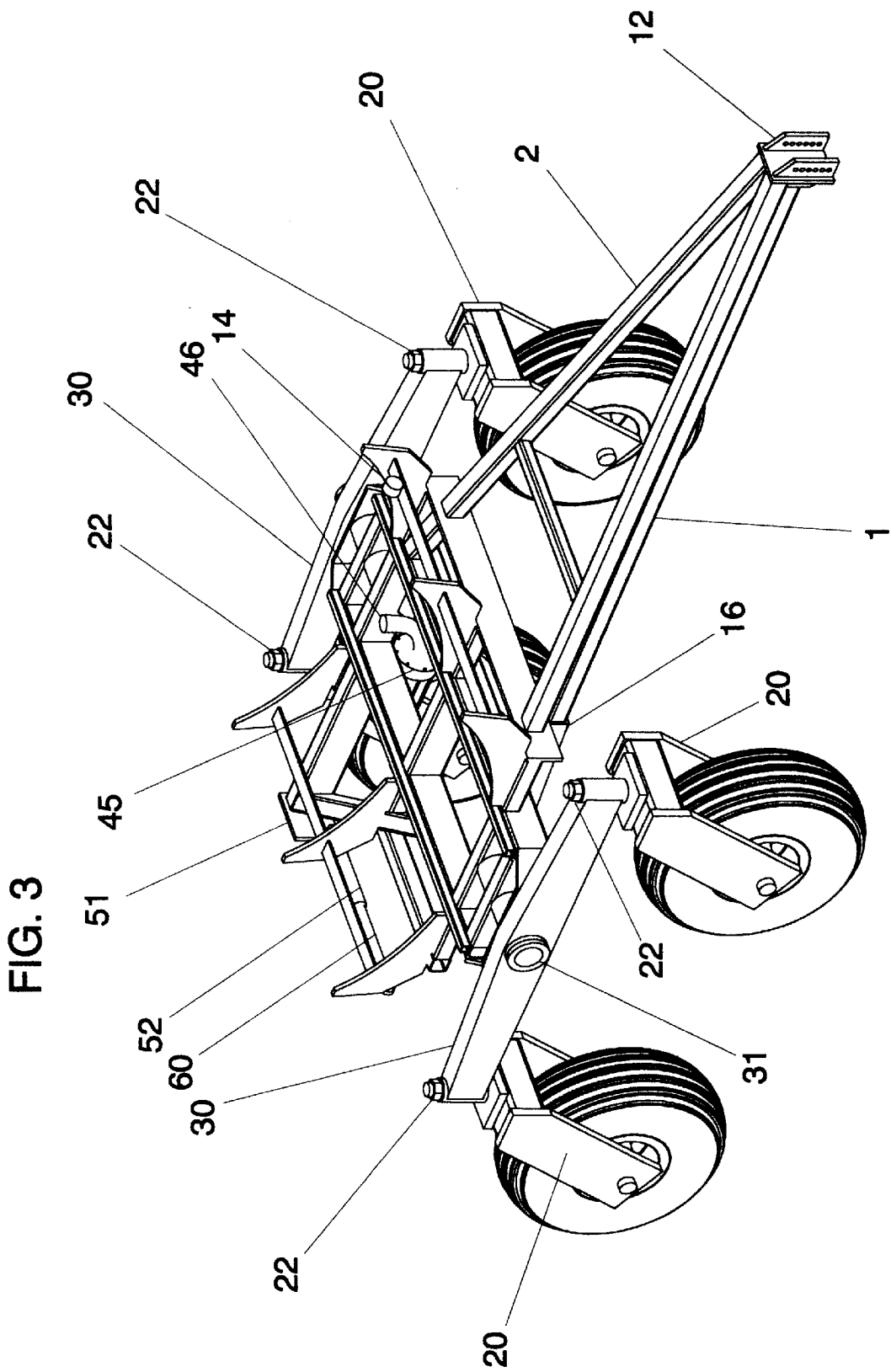
FIG. 3 shows the preferred embodiment of the present invention without tank mount plates.

FIG. 1 shows the preferred embodiment of the present invention, a spray cart 1 with a tank 42 secured to the spray cart 1 with straps 41. FIG. 2 shows the spray cart 1 without the tank 42. FIG. 3 shows the spray cart 1 without tank mount plates 44 so as to illustrate details covered by the tank mount plates 44.

Referring to FIGS. 1, 2, and 3, the spray cart 1 includes a main frame assembly 11, a front hitch assembly 12, a gauge 14, a rear hitch 16, wheel assemblies 20, suspension assemblies 30, tank mount plates 44, a liquid shut off valve 45, a hose 46, and a plate 51. Hydraulic/liquid throughput hoses 15 are from a vehicle towing the spray cart 1 to implements which are in line with, behind, and, as they are attached in line to, towed by the spray cart 1. Usually the vehicle towing the spray cart will be a tractor. However, on occasion, as necessary, a bulldozer or a truck could serve as the towing vehicle.

The spray cart 1 would typically be followed by a subsequent towed implement, including, but not restricted to, a plow or disc, which would be connected mechanically by means of the rear hitch plates 16 and also by an adjustable length stabilizer bar 60. The adjustable length stabilizer bar 60, which connects to the plate 51, comprises a stabilizer body 52, and a stabilizer length adjustment extension 53. The adjustable length stabilizer bar 60 is not inventive in itself and is a common product known to the trade. The stabilizer body 52 is connected to the plate 51 so that the stabilizer body 52 can rotate with respect to the plate 51 in a vertical plane. This typically would be a bolted connection so as to form a pinned joint connection. By pinned joint connection is meant that the stabilizer body 50 is free to rotate with respect to the plate 51 in a given plane. The stabilizer length adjustment extension 53 would typically be threaded inside the stabilizer body 52 so the length of the combination of the stabilizer body 52 so as to provide for length adjustments as required for the adjustable length stabilizer bar 60. The adjustable length stabilizer bar 60 is connected to the subsequent towed implement as a pinned joint.

The purpose of the adjustable length stabilizer bar 60 is to provide a stiff lateral connection between the spray cart 1 and the subsequent towed implement.

The adjustable length stabilizer bar 60 can pivot about the pinned joints in a vertical plane. The rear hitch connection plates 16 are used to hold a pin or bolt securing the subsequent towed vehicle. These two mechanical connections between the spray cart 1 and the towed implement, i.e. the adjustable length stabilizer bar 60 and the hitch plates 16 result in the spray cart 2 and the towed vehicle forming a single implement unit out of the spray cart 1 and the subsequent towed implement so that the combination of the spray cart 1 and the subsequent towed implement tracks in a straight line and turns as a single unit. Often there will be a nitrogen cart or tank behind the subsequent towed implement. A disc is an implement with hydraulic actuated cylinders that are actuated by hydraulic valves in a towing tractor cab controlling hydraulic oil flow in the hydraulic/liquid throughput lines 15. The spray cart 1 acts as a convenience mount for the hydrauic/liquid throughput lines 15 because of the length of the hoses required once the spray cart 1 is used between the towing tractor and subsequent implements in the train, such as a disc and a liquid nitrogen tank. A hydraulic pump that would pump liquid, such as liquid fertilizer, from the spray cart 1 would generally be mounted on the blade plow or disc that is behind the spray cart 1, being towed by the spray cart 1. The idea is to inject liquid fertilizer from the spray cart 1 and liquid nitrogen, i.e. anhydrous ammmonia, into the soil just moments after the blade plow or disc has turned the earth.

Figure 4:
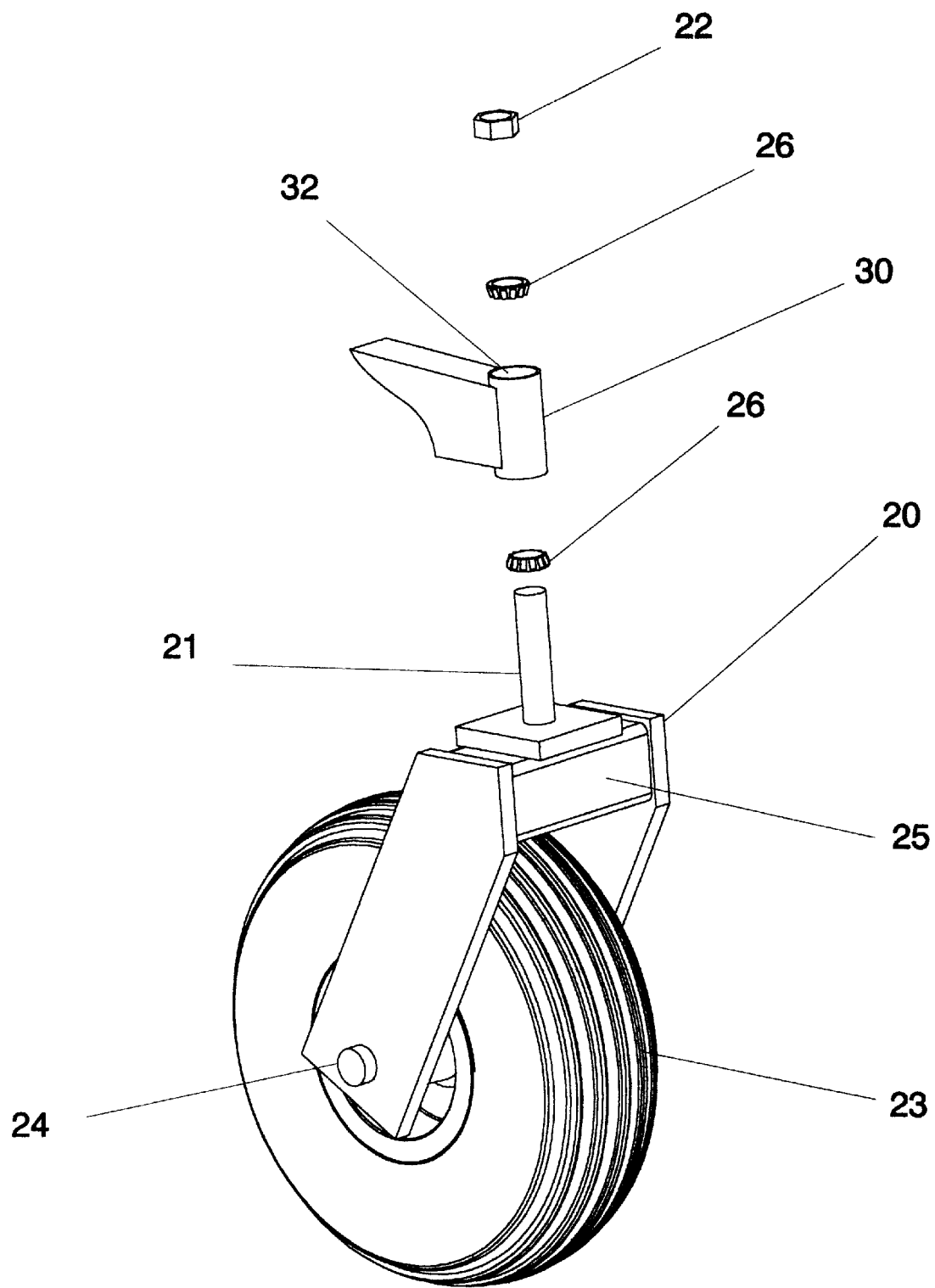
FIG. 4 shows wheel mounting details.

FIG. 4 shows the wheel assembly 20 which includes a frame 25, a wheel 23, an axle shaft 24, and a wheel assembly suspension mount threaded stud 21. The wheel assembly 20 mounts mounts in a stud clearance 32 of the suspension assembly 30 and is secured to the suspension assembly 30 by means of a wheel assembly mount nut 22 secured to the wheel assembly suspension mount threaded stud 21. In the preferred embodiment of the present invention, bearings 26 are included in the assembly of the wheel assembly 30 to suspension assembly 30. The purpose of the mounting arrangements is to have a wheel assembly 20 that rotateable with respect to the suspension assembly 30. As obvious to anyone skilled in the art, there are a variety of bearing arrangements to permit this. The bearings 26 shown are not intended to limit the invention to the type of bearings shown.

As can be seen in the FIGS. 1, 2, 3, and 4, each wheel 23 of each wheel assembly 20 trails the wheel assembly suspension mount threaded stud 21. This permits each of the wheels 23 to swivel as a towing tractor makes a turn, with permits the spray cart 1, which has four wheels 23 in the preferred embodiment of the present invention, to turn with a minimum of skidding or side load on the wheels 23 with the subsequent stresses on the axles shafts 24. This is a major feature and benefit of the preferred embodiment of the present invention, the spray cart 1.

FIG. 5 shows one of the suspension assemblies 30 with a portion of the main frame assembly 11. The suspension assembly 30 is secured to the main frame assembly 11 by means of a suspension pivot shaft 33 in such a way that the suspension assembly 30 rotates, or pivots, with respect to the main frame assembly 11. As obvious to anyone skilled in the state of the art, there are a number of ways to accomplish this, without excessive experimentation. In the preferred embodiment of the present inventnion the suspension pilot shaft 33 is secured within a mounting clearance 19B of a journal 19 in the main frame assembly 11. The suspension assembly 30 includes a suspension assembly bushing 31 into which the suspension pivot shaft 33 is inserted. The suspension pivot shaft 33 has a lock pin clearance 33A. A lock pin 36 secures a suspension pivot shaft end collar 35 through lock pin clearances 35A.

The collar 35 and pin 36 arrangement with the suspension pivot shaft 33 holds the suspension assembly 30 on to the suspension pivot shaft 33. The suspension assembly 30 can rotate with respect to the suspension pivot shaft 33. This is an important feature of the preferred embodiment of the present invention because it allows the spray cart 1 to operate in rough terrain such as a plowed field or a terraced field.

An important feature of the preferred embodiment of the present invention is a means of limiting the amount of rotation of the suspension assembly 30 about the suspension pivot shaft 30. This is accomplished by a limiting stop 34A on an outer travel limiting collar 34 of the suspension assembly bushing 31 as shown in FIG. 5A acting in conjunction with an inner travel limiting stop 19A on the journal 19 shown in FIG. 5.

Figure 6:
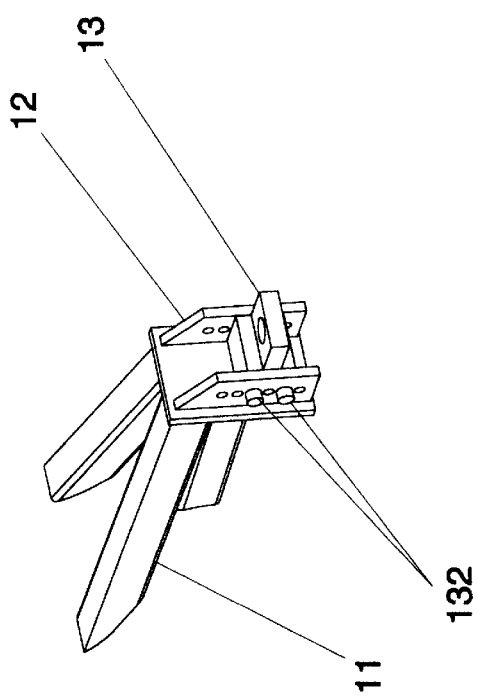
FIGS. 6 and 7 show hitch details.
Figure 7:
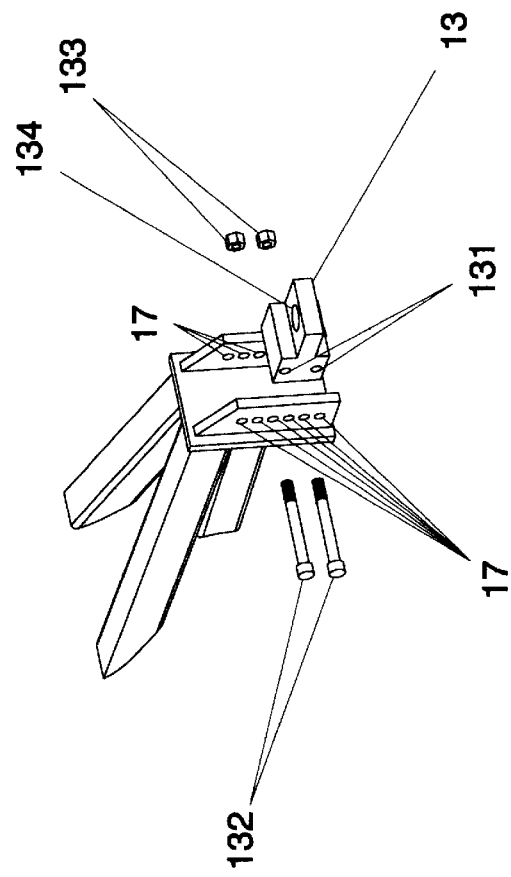

FIGS. 6 and 7 show details of the front hitch assembly 12 which includes a hitch holder 135, a hitch insert 13, front hitch insert mount threaded pins 132 complete with front hitch insert mount pin nuts 133. The hitch holder 135 includes front hitch mount pin clearances 17. The hitch insert 13 includes hitch insert clearances 131 and a front hitch insert clearance 134. As can be seen from FIG. 7, the location of the hitch holder 135 can be raised or lowered with respect to the location of the hitch insert 13 due to the multiplicity of mount pins clearances. The hitch holder 135 is secured to the main frame assembly 11, typically by welding. The hitch insert 13 is secured to a given towing tractor. As tractors differ, the elevation of the hitch insert 13 with respect to ground will vary according to the tractor. The hitch holder 135 is then secured to the hitch insert 13 with the front hitch insert mount threaded pins 132 using whichever of the front hitch mount pin clearances 17 required to keep the spray cart 1 level so a load is not imposed upon a towing tractor from an unlevel spray cart 1 while at rest. An uneven load distribution would adversely affect soil compaction, which is very undesirable. The front hitch insert mount threaded nuts 133 are used to secure the front hitch insert mount threaded pins 132 in place. When there is a disc or plow connected to the spray cart 1, working the soil as the spray cart 1 is towed, it is desirable to have any induced loadings shifted towards the disc or plow as opposed to acting on a towing tractor's wheels. The idea is that more weight on the disc or plow is desirable, while more weight on a towing tractor's wheels causes more ground compaction, which is undesirable. The tongue assembly 2 is relatively long as compared to typical tongue assemblies for prior art two wheel spray carts. The tongue assembly is approximately 30% longer than two wheel spray cart tongue assemblies. With the relatively long tongue assembly 2, forces resulting from normal bounce and jounce as the combination of a towing tractor, the spray cart 1, and a towed disc or plow, are acting more on the towed disc or plow than the towing tractor rear wheels. This is a desirable feature of the preferred embodiment of the present invention which produces the benefit of reduced soil compaction that would have otherwise occurred. A major advantage of the preferred embodiment of the present invention is that it makes possible the transport through the fields of a 1,000 gallon spray tank instead of the 750 gallon spray tank carried by prior art.

The gauge 14 is mounted on the spray cart 1 so that it is readable from the cab of a towing tractor. This is an option to the preferred embodiment of the present invention that permits the tractor operator to visually read the amount of liquid nitrogen remaining in a subsequently towed liquid nitrogen cart or tank. This eliminates the present practise of the operator guessing when he is running low on liquid nitrogen.

The typical material of construction of the spray cart 1 is structural steel. Obviously, as apparant to anyone skilled in the art, other metals can be made to work.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A spray cart comprising:
  a) at least two suspension assemblies each comprising at least two wheels, each of said wheels mounted to the suspension assemblies so that the wheels swivel, said wheels being offset from their mounting so that the wheels trail their mounting,
  b) a main frame assembly to which each of the suspension assemblies are secured by means of a pivot shaft so that each suspension assembly rotates with respect to the main frame assembly, said main frame assembly capable of carrying a tank filled with liquid, a limiting stop on an outer travel limiting collar of a suspension assembly bushing, and an inner travel limiting stop on a journal in the main frame of the spray cart, wherein the limiting stop on the outer travel limiting collar of the suspension assembly bushing acts in conjunction with the inner travel limiting stop on the journal in the main frame of the spray cart to limit the rotation of the suspension assembly about the pivot shaft, c) a hitch assembly connected to the main frame that provides a means of towing the spray cart, said hitch assembly further comprising a hitch holder with hitch pin clearance, a hitch insert with pin clearances, and front hitch insert mount pins, wherein the hitch insert can be raised or lowered in the hitch holder and then pinned into position thus varying the distribution of weight of the spray cart on the wheels, d) a rear hitch, e) at least one plate suitable for attaching an adjustable length stabilizer bar suitable for connection to a subsequent towed vehicle, f) a tank for carrying liquid, g) hydraulic/liquid throughput lines, h) a gauge visible to an operator of a towing tractor while the operator is operating the towing tractor, and i) a tongue assembly that, in combination with said hitch assembly, permits a variation of weight distribution of the spray cart on the wheels by adjusting the elevation of the hitch holder with respect to the hitch insert.

2. A spray cart comprising:

a) at least two suspension assemblies, each comprising at least two wheels, each of said wheels mounted to the suspension assemblies so that the wheels swivel, said wheels being offset from their mounting so that the wheels trail their mounting, b) a main frame assembly to which each of the suspension assemblies are secured by means of a pivot shaft so that each suspension assembly rotates with respect to the main frame assembly, said main frame assembly capable of carrying a tank filled with liquid, a limiting stop on an outer travel limiting collar of a suspension assembly bushing and an inner travel limiting stop on a journal in the main frame of the spray cart, wherein the limiting stop on the outer travel limiting collar of the suspension assembly bushing acts in conjunction with the inner travel limiting stop on the journal in the main frame of the spray cart to limit the rotation of the suspension assembly about the pivot shaft.

* * * * *